Patented Mar. 18, 1930

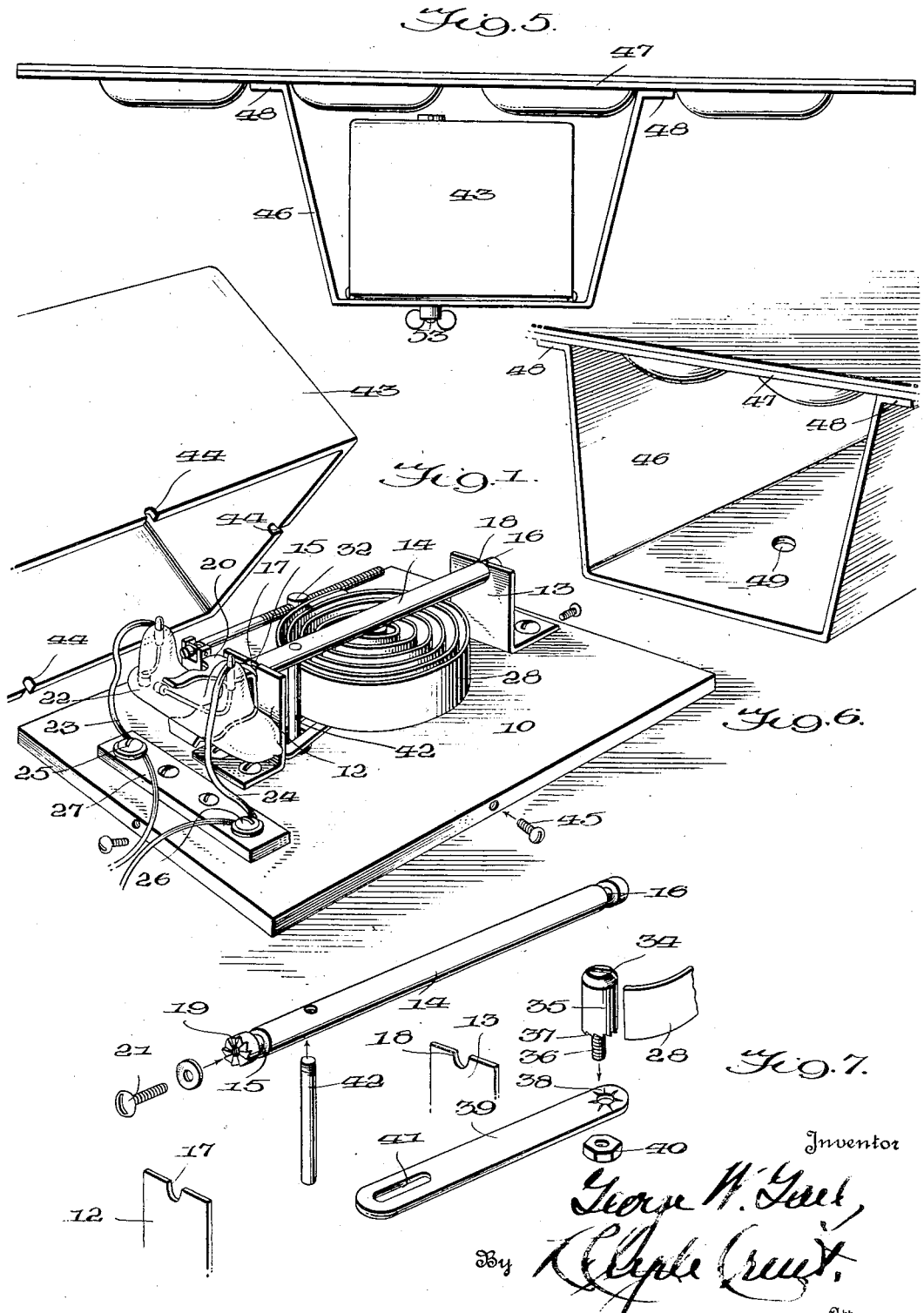

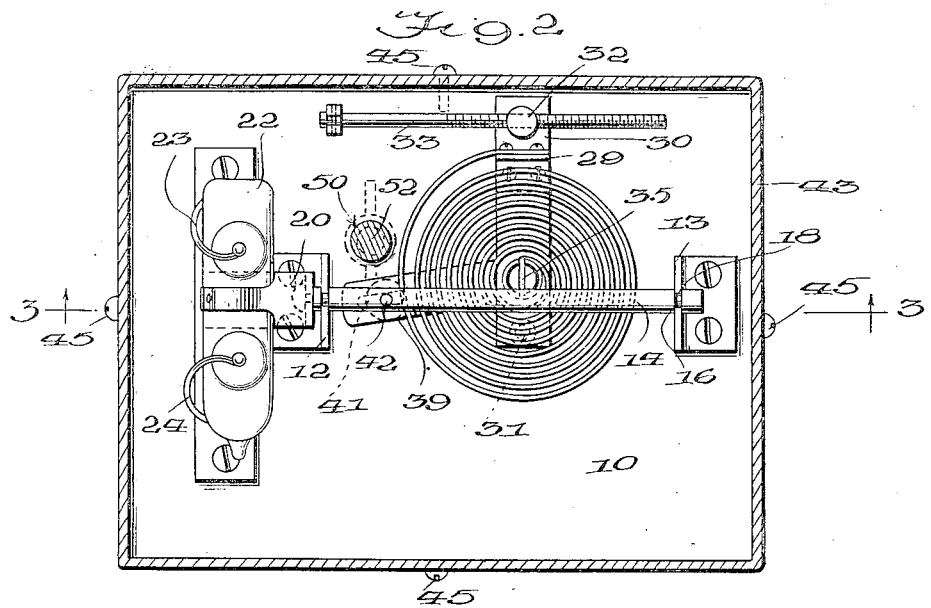
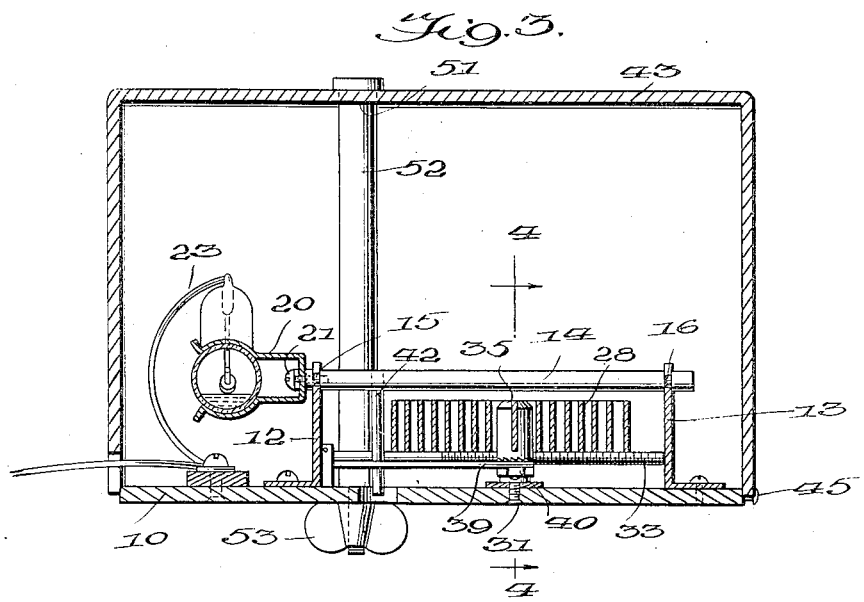
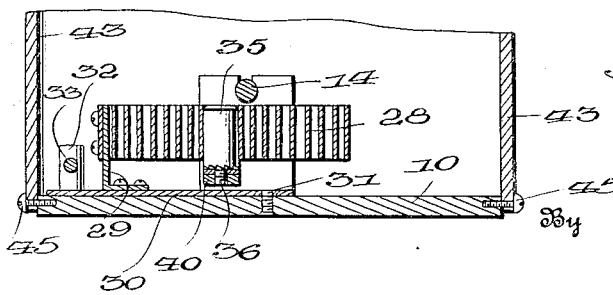

1,751,319

UNITED STATES PATENT OFFICE

GEORGE W. GAIL, OF RUXTON, MARYLAND, ASSIGNOR TO KULAIR CORPORATION, OF NORRISTOWN, PENNSYLVANIA, A CORPORATION OF DELAWARE

THERMOSTAT

Application filed January 12, 1928. Serial No. 246,226.

This invention relates to a thermostatic device of the coil type primarily developed for the purpose of controlling electric circuits to the motor of a household refrigerating machine and of substantially the same form of device as disclosed in the copending application of Abraham J. Kusel and George W. Gail filed March 17, 1927, Serial No. 176,122.

The present invention, however, includes certain refinements and details of construction by way of improvements over the aforesaid application, said improved device being the result of the practical application thereof to household refrigerating machines.

In prior thermostatic apparatus said devices, were adapted to be controlled or caused to function by the temperature of the surrounding atmosphere or in other words the temperature of the air inside the refrigerator. In devices of this character the working parts thereof are necessarily exposed not only to the temperature of the surrounding air but also to the moisture and dampness of the refrigerator. Moreover where the motor regulation is dependent upon a device controlled by atmospheric temperatures, especially in connection with a refrigerator, it is impossible to maintain a uniform temperature therein owing to the fact that in the opening of the refrigerator door outside air is liable to come in contact, more or less directly with the thermostatic element and cause the same to function when it is not necessary. Also a slight variation in the air temperature within the refrigerator (when doors are kept closed) is accompanied by a greater temperature change at the evaporator surface. Thus the thermostat (if located right on the evaporator unit) can control the air temperature at the top of the food chamber within ¾ of one degree F. This has been frequently done, but the thermostat will not cut in or out for a temperature change less than about six degrees F. This shows that the change in evaporator temperature is of greater range than the accompanying change in air temperature.

But, by locating the thermostat on the hanger strap below the evaporator, the air temperature in the food chamber is kept constant within a 3 degree variation, and this is about the range desired. Otherwise the compressor must stop and start too frequently.

It has therefor been found from practical demonstration that the proper regulation of the refrigerating qualities of the refrigerator should not be controlled by the temperature of the air within the refrigerator but by the temperature of the refrigerating or ice making coil, known as the evaporator unit, especially where the maximum ice forming qualities are desired.

The object of the present invention resides in the provision of a device which will be protected and enclosed from the surrounding atmosphere and so designed as to function only through the conductivity of the temperature to the thermostatic element by a metal to metal contact between the thermostatic device and the evaporator unit or coil or similar metallic part of the refrigerating apparatus.

More specifically stated this is accomplished by mounting the working parts of the thermostat on a flat metallic base of such size as to permit a cover being placed over the entire apparatus, the enclosed apparatus adapted to be supported by a bracket depending from one of the elements of the evaporator unit or the like, this bracket also being of such size and shape as to support the entire base of the thermostatic device so that the base will be in close contact with the bracket throughout its entire length and width. This bracket is securely fastened by spot welding or the like to the evaporator unit forming in reality an integral part thereof whereby the actual temperature of said unit will be accurately transmitted through the bracket and in turn through the base plate of the thermostatic device by reason of the metal to metal contact and the temperature of the thermostat base will be transmitted to the thermostatic element in an obvious manner. There is a slightly higher temperature at the bottom of bracket and thermostat base than at evaporator proper, as the circulating air adds some slight heat to the bracket. This is desirable, as it gives slightly less sensitive action to the thermostat and prevents the compressor starting and stopping too frequently.

The instant invention also contemplates certain specific improvements to be hereinafter more fully described.

The preferred embodiment of the invention is illustrated in the accompanying drawings, in which Fig. 1 is a view in perspective showing the assembled device with the cover removed;

Fig. 2 is a top plan view illustrating the cover or enclosure in section;

Fig. 3 is a longitudinal sectional view on line 3—3 of Figure 2;

Fig. 4 is a partial sectional view on line 4—4 of Fig. 3;

Fig. 5 is an end elevation illustrating the manner of supporting the enclosed thermostatic device in operative position relative to the evaporator unit;

Fig. 6 is a partial view in perspective of the supporting bracket for said unit; and Fig. 7 illustrates various details of construction of certain parts of the device.

Referring to the drawings in detail with particular reference to Fig. 1 the improved thermostat comprises a base of flat sheet metal 10, preferably brass, pivotally supporting thereon by brackets 12 and 13 a transverse oscillating shaft 14, the opposite ends of the shaft 14 being provided with reduced portions 15 and 16 (see Fig. 7), providing journals adapted to cooperate with recesses or slots 17 and 18 formed in the upper edges of the supporting brackets 12 and 13. One end of the shaft 14 is provided with a burr or the like 19 to form a locking engagement with a U-shaped resilient support 20, said support being secured to the end of said shaft by a screw or the like 21. It is to be here noted that the engaging face of the support 20 is likewise provided with a roughened surface co-operating with the burred end 19 of the shaft 14, whereby said support will be locked in the desired adjusted position and prevented from rotating with respect to the shaft 14. Secured between the arms of the resilient support 20 is a mercury tube switch 22, said switch being provided with wires or conductors 23 and 24 running to binding posts or screws 25 and 26 respectively carried by a strip of insulating material 27 secured to the base plate 10 of the device. Mounted beneath the oscillating shaft 14 is a coiled thermal element 28, said coil being secured by its outer end (see Fig. 4) to a bracket 29 which bracket is in turn carried by a metallic strip or the like 30 pivotally secured to the base 10 by a screw or a similar fastening 31 in such a manner as to be in close contact with said base. The plate 30 is extended out beyond the bracket 29 and provided with an upstanding pin or the like 32 through which is threaded an adjusting screw 33 forming one of the means for adjusting the tension of the thermal element 28, said strip 30 and bracket 29 forming the means of securing or anchoring the thermal element to the base 10.

The inner free end of the thermal coil 28 is secured in a slot 34 (see Fig. 7) formed in a pin 35 provided with a reduced threaded lower portion 36. The lower end of this pin 35 adjacent the reduced threaded portion 36 is constructed with a roughened or toothed surface 37 adapted to be engaged by a similarly roughened surface 38 formed on the inner end of an arm 39, said parts being secured together by a nut or the like 40. These complementary roughened surfaces 37 and 38 provide a means of adjusting the arm 39 with respect to the pin 35 and at the same time assuring a locking of these parts together in the desired adjusting position. The outer end of the arm 39 is provided with an elongated slot 41 for engagement with the lower end of a pin 42 rigidly secured to the oscillating shaft 14 whereby any contraction or expansion or winding or unwinding of the thermal coil 28 during the operation or function of the device, will cause a movement of the pin 42 and consequently an oscillation of the shaft 14 and in turn a rocking of the mercury tube 22 to make and break the circuit to the motor as conditions may require in the usual working or functioning of devices of this character.

In order to protect the working parts of the device, above described, from atmospheric influences the same is provided with a cover 43. This cover is preferably made of nonconducting material. The lower edge of this cover is provided with notches or small slots 44 adapted to be positioned over and clamped by screws or similar fastenings 45. By providing notches instead of holes the cover can be quickly removed by simply loosening the screws 45 making it unnecessary to entirely remove the screws as would be the case if holes were employed. It is to be also noted that the lower edge of the cover does not extend to the bottom face of the base plate 10. This is important and will prevent the base plate 10 from being forced out of its, metal to metal contact with its supporting bracket, to be hereinafter described, as might happen if the lower edges of the cover 43 completely enclosed the edges of the base plate 10 or extended slightly below said base plate.

Cooperating with the thermostatic element above described, with particular reference to the base thereof is a bracket or the like 46 adapted to be suspended and secured to the evaporator unit 47, said evaporator unit being of the sheet metal type involving a flat plate and corrugated plate as described in a copending application in the name of George W. Gail and Abraham J. Kusel filed January 13, 1927, Serial No. 160,960. This bracket is of substantially U-form and provided with angularly disposed flanges 48 which form a means of securing the bracket to the evaporator unit by means of spot welding or the like. The bottom portion of the bracket is provided with an opening or aperture 49 adapted to register with openings 50 and 51 in the base plate 10 and top of the casing 43 respectively, for the reception of a bolt or the like 52, said bolt being provided with a threaded lower end to receive a wing nut or similar fastening element 53 whereby the complete device is securely anchored in position and a close metal to metal contact is assured between the lower part of the bracket 46 and the base plate 10.

It is of course to be understood that various changes within the scope of the claims can be made in the thermostatic device and also in the manner of securing said thermostatic device in operative relation with respect to the evaporator unit as long as there is a metal to metal contact between the base plate 10 of the thermostatic device and the evaporator unit or similar metallic part of the refrigerating apparatus.

It is believed that the operation of the thermostatic device will be perfectly clear from the foregoing description and it is not thought necessary to further describe the operation in detail.

What I claim is:

1. In a thermostat, the combination with a base plate, of a thermal coil, means for adjustably securing the outer end of said thermal coil to said base plate to provide a metal to metal contact therebetween, an electric circuit breaker also mounted on said base, and an adjustable arm secured to the inner free end of said coil for operating said circuit controlling device.

2. In a thermostat, the combination with a base plate, of a thermal coil, means for adjustably securing the outer end of said thermal coil to said base to provide a metal to metal contact therebetween, an oscillating electric circuit controlling device, said device including an oscillating shaft and means for journaling said shaft on the base plate, and an adjustable arm secured to the inner free end of said coil for operating said circuit breaker.

3. In a thermostat, the combination with a base plate, of a thermal coil, means for adjustably securing the outer end of said thermal coil to the base to provide a metal to metal contact therebetween, a mercury tube switch and a support therefor, an oscillating shaft, brackets carried by the base plate providing bearings for said shaft, means for adjustably securing one end of the oscillating shaft to the mercury tube switch support, and an arm adjustably secured to the inner free end of said coil for oscillating said shaft and mercury tube switch.

4. In a thermostat, the combination with a base plate, of a thermal coil, a plate adjustably pivoted to said base plate, means for securing the outer end of said thermal coil to said pivoted plate, an oscillating electric circuit controlling device, said device including an oscillating shaft and means for journaling said shaft on the base plate and an adjustable arm secured to the inner free end of said coil for operating said circuit controlling device.

5. In a thermostat, the combination with a base plate, of a thermal coil, a plate adjustably pivoted to said base plate, means for securing the outer end of said thermal coil to said pivoted plate, an oscillating electric circuit controlling device, said device including an oscillating shaft and means for journaling said shaft on the base plate, an arm carried by said shaft, and an adjustable arm secured to the inner free end of said coil to engage said first mentioned arm for operating said circuit controlling device.

In testimony whereof I affix my signature.

GEORGE W. GAIL.